United States Patent
Rorabaugh et al.

(10) Patent No.: US 10,112,724 B2
(45) Date of Patent: Oct. 30, 2018

(54) APPARATUS FOR PREVENTING SPARK PROPAGATION

(71) Applicant: The Boeing Company, Chicago, IL (US)

(72) Inventors: Michael E. Rorabaugh, Seattle, WA (US); James P. Irwin, Renton, WA (US); Benjamin A. Johnson, Lynwood, WA (US); Erik W. Dowell, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 177 days.

(21) Appl. No.: 14/461,886

(22) Filed: Aug. 18, 2014

(65) Prior Publication Data
US 2015/0091293 A1 Apr. 2, 2015

Related U.S. Application Data

(62) Division of application No. 13/167,809, filed on Jun. 24, 2011, now Pat. No. 8,840,740.

(51) Int. Cl.
| | |
|---|---|
| *F16L 47/00* | (2006.01) |
| *B64D 37/32* | (2006.01) |
| *B64D 45/02* | (2006.01) |
| *F16L 25/03* | (2006.01) |

(52) U.S. Cl.
CPC ............. *B64D 37/32* (2013.01); *B64D 45/02* (2013.01); *F16L 25/03* (2013.01); *Y10T 29/49227* (2015.01); *Y10T 137/0402* (2015.04)

(58) Field of Classification Search
CPC ....... F16L 2201/30; F16L 55/24; F16L 13/11; F16L 13/12; F16L 13/103; F16L 13/10
USPC ............... 285/915, 289.1–289.3, 293.1, 285/294.1–294.4, 924, 14
See application file for complete search history.

(56) References Cited

U.S. PATENT DOCUMENTS

| | | | | |
|---|---|---|---|---|
| 283,974 | A * | 8/1883 | Converse ............... | F16L 13/12 285/294.1 |
| 344,760 | A * | 6/1886 | Wilbur .................... | F16L 13/11 285/296.1 |
| 1,963,421 | A * | 6/1934 | Robinson ............... | F16L 13/08 285/289.1 |

(Continued)

FOREIGN PATENT DOCUMENTS

| | | |
|---|---|---|
| CN | 2376657 | 5/2000 |
| CN | 201568670 | 9/2010 |
| DE | 10225960 | 10/2003 |

OTHER PUBLICATIONS

English translation of DE 102004023656, Buenning, Ralf-Peter (published Nov. 17, 2005).

(Continued)

*Primary Examiner* — Aaron M Dunwoody
(74) *Attorney, Agent, or Firm* — Vivacqua Law

(57) ABSTRACT

A hydraulic joint is disclosed. The hydraulic joint includes a tube, a hydraulic fitting, and a tip seal. The hydraulic fitting may be positioned around the tube. The hydraulic fitting may include a first open end for receiving the tube. The tip seal may be configured to define an opening that allows for the passage of leaks. The tip seal may be positioned on the hydraulic fitting adjacent the open end and forming a mechanical barrier between the fitting and the tube.

9 Claims, 6 Drawing Sheets

(56) References Cited

U.S. PATENT DOCUMENTS

| | | | | |
|---|---|---|---|---|
| 2,156,604 A * | 5/1939 | Payne | F16L 13/12 | 285/287.1 |
| 2,180,695 A * | 11/1939 | Rembert | F16L 13/12 | 264/262 |
| 2,313,074 A * | 3/1943 | Jewell | F16L 13/11 | 264/263 |
| 2,399,103 A * | 4/1946 | Clinedinst | F16L 13/103 | 156/304.2 |
| 2,710,113 A | 6/1955 | Pritchard | | |
| 2,759,254 A * | 8/1956 | Soehnlen | F16L 13/10 | 285/294.3 |
| 2,924,546 A | 2/1960 | Shaw | | |
| 3,198,556 A * | 8/1965 | Kruse | F16L 13/08 | 285/289.1 |
| 3,343,252 A * | 9/1967 | Reesor | F16L 13/103 | 285/294.1 |
| 3,415,287 A * | 12/1968 | Lanza | B29C 61/06 | 138/141 |
| 3,784,239 A * | 1/1974 | Carter | B29C 33/52 | 285/294.2 |
| 3,792,588 A * | 2/1974 | Gilaad | A01G 25/023 | 239/542 |
| 3,822,464 A * | 7/1974 | Hester | B21D 39/06 | 228/136 |
| 3,856,333 A * | 12/1974 | Cox | A01G 25/023 | 239/542 |
| 3,937,641 A * | 2/1976 | Kushner | F16L 13/103 | 138/DIG. 1 |
| 4,174,124 A | 11/1979 | Dockree | | |
| 4,361,380 A * | 11/1982 | Marazzi | G02B 6/3833 | 285/13 |
| 4,382,049 A | 5/1983 | Hofmeister et al. | | |
| 4,396,213 A * | 8/1983 | Hawkins | F16L 13/161 | 228/173.4 |
| 4,624,486 A * | 11/1986 | Nishino | F16L 47/20 | 285/294.2 |
| 4,786,086 A | 11/1988 | Guthrie et al. | | |
| 4,897,143 A | 1/1990 | Covey | | |
| 4,905,931 A | 3/1990 | Covey | | |
| 5,131,688 A | 7/1992 | Tricini | | |
| 5,137,202 A * | 8/1992 | Purdy, III | B23K 1/18 | 228/132 |
| 5,176,410 A * | 1/1993 | Beyer | F16L 13/08 | 228/56.3 |
| 5,260,100 A | 11/1993 | Day | | |
| 5,282,652 A * | 2/1994 | Werner | F16L 58/182 | 277/607 |
| 5,333,918 A * | 8/1994 | Crout | F16L 13/08 | 228/136 |
| 5,433,486 A * | 7/1995 | Mannl | F16L 13/11 | 285/114 |
| 5,702,111 A | 12/1997 | Smith | | |
| 6,004,417 A * | 12/1999 | Roesch | C09J 9/00 | 156/155 |
| 6,022,054 A * | 2/2000 | Hemphill | B29C 65/5042 | 285/398 |
| 6,065,783 A * | 5/2000 | Chiarelli | F16L 13/08 | 228/214 |
| 6,467,545 B1 | 10/2002 | Venkataraman et al. | | |
| 6,494,501 B2 * | 12/2002 | Gotoh | F16L 13/103 | 285/21.3 |
| 7,753,412 B2 * | 7/2010 | Royston | F16L 47/005 | 137/312 |
| 7,887,099 B2 * | 2/2011 | Kurata | B21C 37/154 | 285/123.3 |
| 8,181,327 B2 | 5/2012 | Apfel | | |
| 8,528,763 B2 * | 9/2013 | Svensson | B30B 11/002 | 220/4.01 |
| 2003/0090108 A1 * | 5/2003 | Palsson | B29C 65/5042 | 285/294.2 |
| 2004/0201174 A1 * | 10/2004 | Dodgson | B29C 65/548 | 277/316 |
| 2006/0078399 A1 | 4/2006 | Coddington et al. | | |
| 2008/0283581 A1 * | 11/2008 | Jeon | B23K 31/027 | 228/189 |
| 2012/0201627 A1 | 8/2012 | Apfel | | |
| 2012/0326433 A1 | 12/2012 | Rorabaugh et al. | | |
| 2013/0153136 A1 | 6/2013 | Day et al. | | |
| 2013/0168958 A1 * | 7/2013 | Van Den Bergh | B29C 61/0616 | 285/294.1 |
| 2015/0219254 A1 * | 8/2015 | Lee | F16L 13/103 | 285/294.1 |
| 2015/0260316 A1 * | 9/2015 | Mako, Jr. | F16L 13/08 | 585/636 |
| 2015/0377390 A1 * | 12/2015 | Oosaki | F16L 13/103 | 285/294.1 |

OTHER PUBLICATIONS

U.S. Appl. No. 13/167,809, Non-Final Office Action (dated Jan. 15, 2014).
U.S. Appl. No. 13/167,809, Notice of Allowance (dated Jun. 13, 2014).
CN, Notification of First Office Action; Patent Application No. 201280030555.X (dated Jan. 4, 2015).
CN, Notification of Second Office Action. Patent Application No. 201280030555.X (dated Jul. 27, 2015).
European Search Report, European Application No. 12195497.8 (dated Mar. 13, 2013).
U.S. Appl. No. 13/325,190, Office Action (dated Sep. 12, 2013).
U.S. Appl. No. 13/325,190, Notice of Allowance (dated Dec. 24, 2013).
U.S. Appl. No. 14/260,763, Non-Final Office Action (dated Oct. 6, 2014).
U.S. Appl. No. 14/260,763, Notice of Allowance (dated Jan. 22, 2015).
RU, Office Action; Russian Patent Application No. 2014100989/11 (dated Mar. 21, 2016).

* cited by examiner

APPARATUS FOR PREVENTING SPARK PROPAGATION

RELATED APPLICATIONS

This application is a divisional application of U.S. application Ser. No. 13/167,809, filed on Jun. 24, 2011.

BACKGROUND

The present disclosure relates to hydraulic fitting safety devices, particularly for use in airplanes or other aircraft.

In modern commercial airplanes, fuel is traditionally stored in the wings. A number of hydraulic lines may pass through the fuel storage area to provide power and control to hydraulically powered elements, such as wing flaps. These hydraulic lines require a number of fittings to connect various lengths of hydraulic tubing to each other, other fittings, and to bulkhead panels and direct the hydraulic fluid. During operation of the aircraft, it is possible that an electrical spark could be created between a hydraulic line and a fitting and propagate to the fuel tank, thereby causing a potential ignition source. This risk is contained or prevented in a number of ways, the present disclosure describes an alternative improved method and apparatus for inhibiting spark propagation from a fitting to the fuel tank.

The Federal Aviation Administration (FAA) has expressed concern regarding this potential ignition sources in the fuel tank of aircraft. Federal Aviation Regulation (FAR) 25.981 (a)(3) (14 CFR 25.981(a)(3)) requires that any potential ignition source must be sufficiently contained by redundant ignition prevention measures. The specific language requires "that an ignition source could not result from each single failure, from each single failure in combination with each latent failure condition not shown to be extremely remote, and from all combinations of failures not shown to be extremely improbable." This regulation generally requires that the system have triple redundancy, or three safety devices which would have to independently fail, in order to cause an ignition source to result in the aircraft fuel tank. Double redundancy may be sufficient for permanent installations where the ignition prevention measures are shown to be highly reliable.

Current methods of satisfying this requirement focus on reducing the possibility of sparks between the hydraulic line and fitting. One potential source of sparks is electrical current flowing along the hydraulic lines. The electrical current may jump from a hydraulic line to a fitting, thereby causing a spark. One method in use is dissipating or directing electrical current away from the hydraulic lines so that electrical current does not pass through the fuel tank. For example, in-line static dissipaters may be used to prevent electrical current. These methods of mitigating this risk may require a large number of parts, increasing cost, complexity, and installation time.

Some existing fitting designs include a polymeric liner within the fittings to protect tubes and fittings from wear in surface. Without the use of electrical dissipation this liner could exacerbate sparking problems when dielectric breakdown occurs near the tip of the fitting if the fitting is forced to carry large amounts of electrical current due to a lightning strike. Hydraulic tubes in carbon fiber reinforced plastic (CFRP) wings will potentially carry higher current levels than similar fittings in metal wing airplanes. Additional safety features may therefore be required to ensure safety and compliance with Federal regulations.

In-line electrical isolators that disrupt current flow may be used to prevent current flow through the hydraulic line, thereby preventing sparking due to electrical current. These in-line static dissipaters are generally electrically non-conductive tubes that are inserted in the hydraulic line. These non-conductive tubes resist current flow, thereby causing current to flow through structure other than the hydraulic line. This system may not be desirable because it adds additional weight to the system and prevents the use of hydraulic lines as a means to conduct electrical current.

Another source of sparking may be hot material that is forced out from the fitting under pressure. This hot material may be lubricant used to protect the fittings, molten metal from internal sparking, or any other material which may become heated due to pressure or resistance to electrical current and forced out from the hydraulic fitting.

With the increased desire for light weight composite or otherwise non-conductive (or low-conductivity) materials for the fuel tank and other aircraft structure, it may not be desirable or possible to transfer electrical current from the hydraulic lines to the fuel tank to eliminate the risk of sparking. Additionally, a composite or non-conductive fuel tank may build up precipitation static as the aircraft travels through the air. This precipitation static must be dissipated away from the fuel tank to prevent sparking or damage to the fuel tank. Conductive hydraulic lines may be utilized to transfer electrical current or dissipate precipitation static from the fuel tank.

Therefore, there is a recognized need in the art for a method and apparatus for increasing safety of hydraulic joints by preventing sparks from propagating from a hydraulic joint to the surrounding medium while maintaining conductive properties of the hydraulic line.

There is further recognized a need in the art for safety materials which are useful in dissipating precipitation static from a composite fuel tank surface while preventing spark propagation from the hydraulic line to the surrounding medium.

SUMMARY

In one aspect, a hydraulic joint is disclosed. The hydraulic joint includes a tube, a hydraulic fitting, and a tip seal. The hydraulic fitting may be positioned around the tube. The hydraulic fitting may include a first open end for receiving the tube. The tip seal may be configured to define an opening that allows for the passage of leaks. The tip seal may be positioned on the hydraulic fitting adjacent the open end and forming a mechanical barrier between the fitting and the tube.

In another aspect, a hydraulic joint assembly for an aircraft is disclosed. The hydraulic joint assembly includes a tube defining a portion of a hydraulic line of the aircraft. The hydraulic joint assembly may also include a hydraulic fitting positioned around the tube. The hydraulic fitting may include a first open end for receiving the tube. The hydraulic joint assembly may also include a tip seal configured to define an opening that allows for the passage of leaks. The tip seal may be positioned on the hydraulic fitting adjacent the open end and forming a mechanical barrier between the hydraulic fitting and the tube.

In still another aspect, an aircraft is disclosed. The aircraft may include a tube defining a portion of a hydraulic line. The hydraulic line passes through a wing of the aircraft. The aircraft may include a hydraulic fitting positioned around the tube. The hydraulic fitting may include a first open end for receiving the tube. The aircraft may include a tip seal configured to define an opening that allows for the passage of leaks. The tip seal may be positioned on the hydraulic fitting adjacent the open end and forming a mechanical barrier between the fitting and the tube.

The above-described method may include the further step of applying a tape about the hydraulic joint before applying the heat shrink wrap. This tape may provide an additional layer of protection and the heat shrink wrap may protect against the tape unwinding due to exposure to the surrounding medium.

DESCRIPTION

Figure 1:
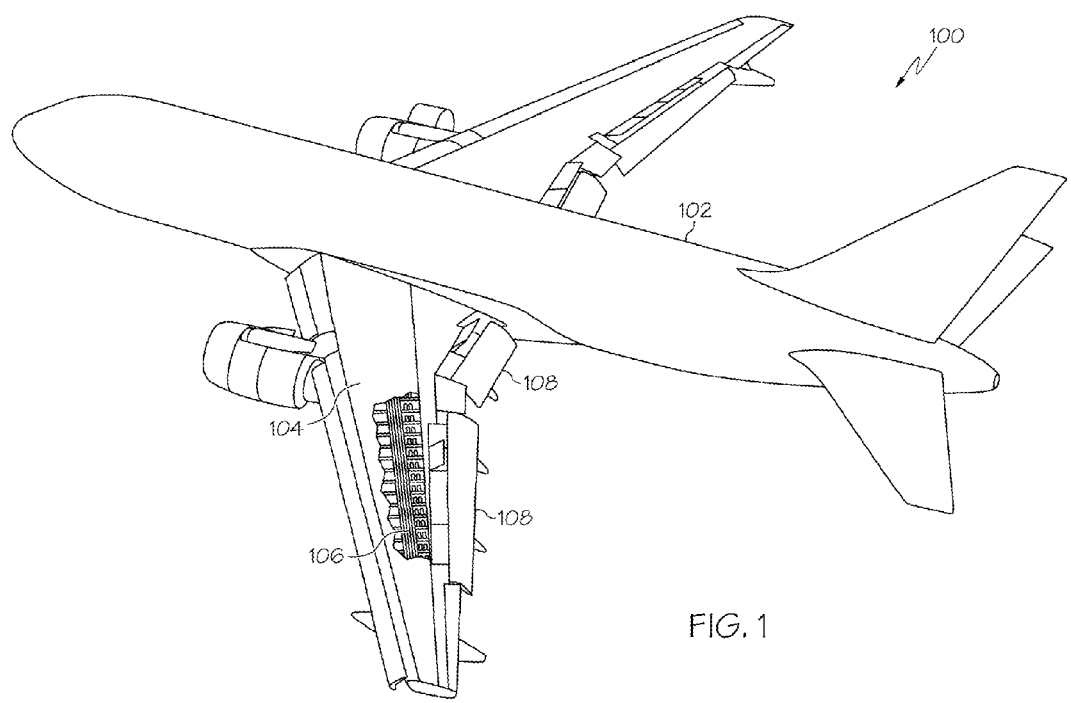
FIG. 1 is a perspective view of an aircraft.
Figure 2:
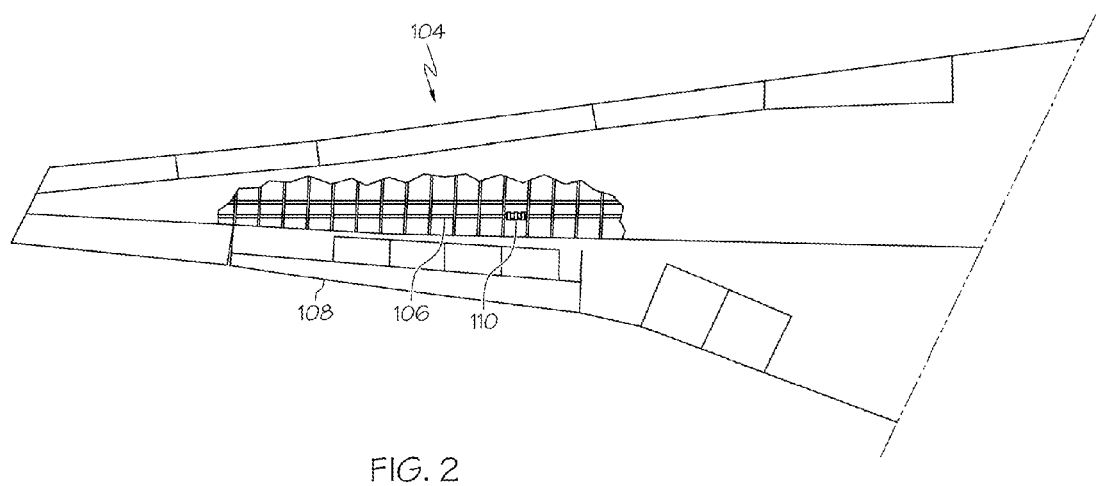
FIG. 2 is a cutaway view of a portion of the aircraft wing.

As shown in FIG. 1, a commercial aircraft 100 generally consists of a fuselage 102, wings 104, including hydraulic lines 106 and flaps 108. Flaps 108 are positioned on the wings 104 to provide in-flight control for the aircraft. As shown in FIG. 2, the hydraulic lines 106 may pass through the wing 104 of the aircraft and may include one or more hydraulic joints 110. These hydraulic lines 106 may control the flaps 108 or other control structure for the aircraft.

Figure 3:
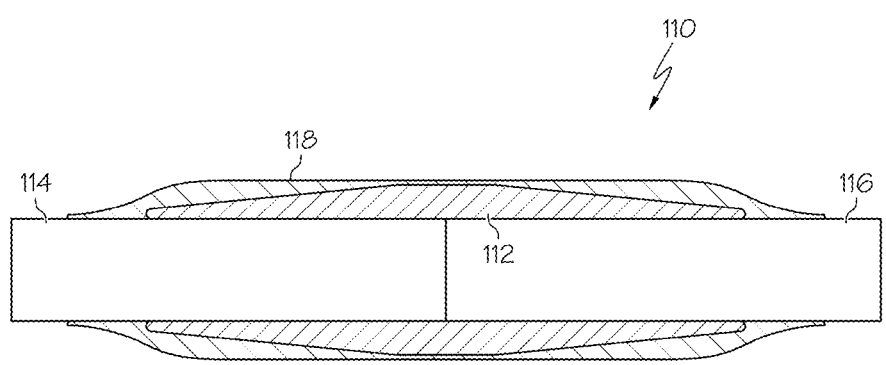
FIG. 3 is a cutaway view of one embodiment of the apparatus.

FIG. 3 shows a cutaway view of one embodiment of the improved apparatus. As shown in this figure, the hydraulic joint 110 generally consists of a hydraulic fitting 112 is generally positioned around hydraulic tubes 114, 116. In this illustration, the hydraulic fitting 112 is a coupler for joining a first section 114 to a second section 116 of the hydraulic line 106. The first 114 and second 116 sections of the hydraulic line 106 may be secured by swaging or any other means commonly known to those having skill in the art. As further shown in this figure, the hydraulic fitting 112 may include internal seals or fittings (not shown) to prevent hydraulic fluid leaking from the fitting 112.

Further shown in FIG. 3 is one type of apparatus for reducing the risk of ignition sources within the aircraft fuel tank. Generally surrounding the hydraulic tubes 114, 116 and fitting 112 is a sleeve 118 which may be wrapped tape or a cylindrical sheath secured by heat shrinking to the hydraulic tubes 114, 116 and fitting 112. This sleeve 118 may provide a mechanical barrier preventing spark propagation from within the fitting 112 to the fuel tank.

The sleeve 118 may be formed of a tape wrapped around the fitting 112 and tubes 114, 116, or may consist of a heat-shrink material formed onto the line during assembly. Wrapped tape is preferably installed during assembly of the fitting 112 to the tubes 114, 116, while a heat shrink sleeve may be attached to or placed around the fitting 112 prior to assembly of the fitting 112 to the tubes 114, 116. Alternatively, the sleeve 118 may consist of both a wrapped tape as well as a heat shrink material about the wrapped tape to prevent unwinding of the tape. This arrangement would prevent a layer of tape from losing adhesion due to exposure to the fuel stored in the tank. Such a result could compromise the safety of the protective feature.

The physical properties of the sleeve 118 may vary according to the preferred function of the sleeve 118. The size of the sleeve 118 is adjusted to the intensity of the anticipated sparking, and therefore the thickness and scope of coverage may vary. Generally the thickness of the sleeve 118 may be 0.005-0.020" and extend 0.25-1.5" beyond the ends of the fittings. This arrangement provides sufficient resistance against spark propagation to eliminate the risk of fuel combustion.

The material of the sleeve 118 is generally selected so as to be resistant to corrosion due to exposure to fuel and hydraulic fluid and may have anywhere from moderate to no electrical conductivity. A low to moderate level of conductivity allows static charge to be drained from the surface of the sleeve. Alternatively, very low to no conductivity from a dielectric sleeve 118 may be selected according to preferred characteristics of the sleeve 118.

One example of material for the sleeve 118 is fluorinated ethylene propylene (FEP). This material may serve as a dielectric and not allow static charge to be drained to the hydraulic line. Alternatively, the sleeve 118 may be constructed of a carbon-impregnated plastic (or other conductive material) that is electrically conductive and fuel resistant. This conductive sleeve 118 may be utilized to drain static buildup from the sleeve.

A further example of heat shrink material for the sleeve 118 is polytetrafluoroethylene (PTFE). This material has a high melting point, high toughness, and is chemically inert. Other examples are polyetheretherketone (PEEK) and polyetherketoneketone (PEKK) that exhibits essential properties similar properties to PTFE. These materials may capture any sparks which would otherwise be expelled from the joint. Any spark that manages to escape the shrink wrap material would have a significantly reduced incendiary capacity. Other materials with similar chemical durability and operating temperature range could be used in the apparatus.

Other methods of installing heat shrink sleeving are contemplated by the present disclosure. For example, multiple pieces of sleeve tubing could be applied to specific areas of joints where metal tubes meet the fitting. These separate pieces would independently cover a portion of the fitting and metal tube, thereby reducing the amount of heat shrink material required. Multiple separate pieces of heat shrink sleeving may also be used on fittings including the joinder of more than two pipes, for example in a tee or cross fitting where three or four pipes are joined to a single fitting. Because sparks can only be expelled from the specific areas of the joints where the metal tubes and fitting come together, the use of separate, smaller pieces of heat shrink sleeving may be utilized to provide effective spark mitigation while reducing the amount of heat shrink sleeving material that must be used.

Figure 4A:
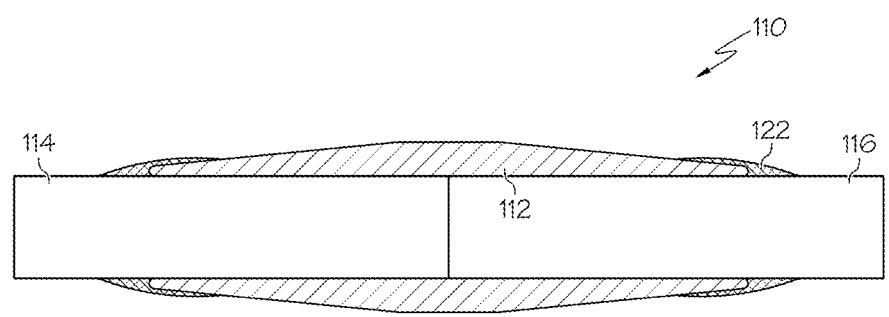
FIG. 4A is a cutaway view of an alternative embodiment of the apparatus.
Figure 4B:
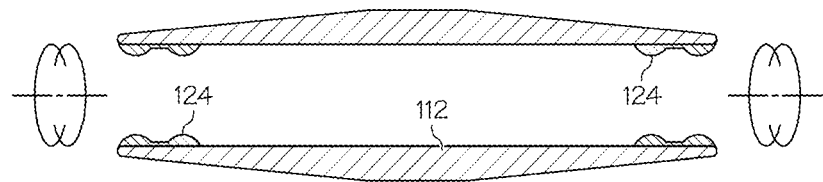
FIG. 4B is a cutaway view of an alternative embodiment of the apparatus.

An alternative arrangement of mechanically sealing the hydraulic fitting 112 and tubes 114, 116 is generally shown in FIGS. 4A-B. In these cutaway views, tip seals 122 or sealing material 124 is positioned on the fitting 112 to mechanically isolate sparks from interacting with the fuel.

FIG. 4A shows the use of a tip seal 122 for covering the edges of the fitting 112. In this arrangement, a dielectric or nonconductive material is positioned about the outside perimeter of the fitting 112 where it joins with the tubes 114, 116. This tip seal 122 may cover the exposed edge of the fitting 112 and adhere to the tubes 114, 116. This arrangement provides a mechanical seal against spark propagation from within the fitting 112 to the fuel tank.

In this case, the tip seal 122 must be applied after assembly of the fitting 112 to the tubes 114, 116 so that a tight seal can be formed between the fitting 112 and tubes 114, 116.

Figure 4C:
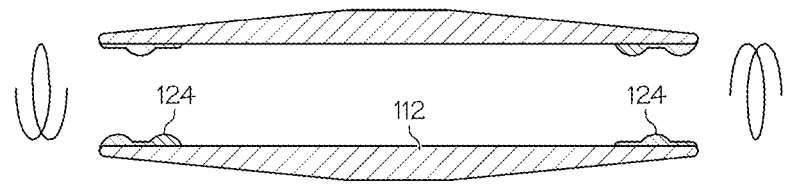
FIG. 4C is a cutaway view of an alternative embodiment of the apparatus.
Figure 4D:
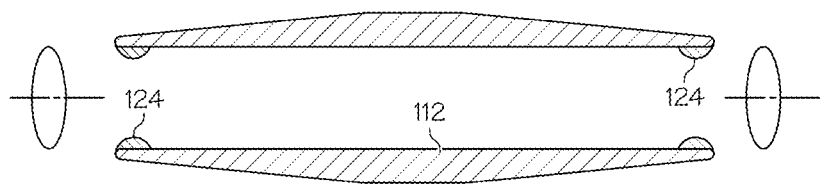
FIG. 4D is a cutaway view of an alternative embodiment of the apparatus.

Alternatively, as shown in FIGS. 4B-D, a sealing material 124 may be positioned on the inside of the fitting 112 instead of or in addition to a tip seal 122 around the perimeter of the edge of the fitting 112. The sealing material 124 may be applied as one or more incomplete rings (FIG. 4B), spiral (FIG. 4C), or complete circles (FIG. 4D). The use of incomplete rings or spirals may be used to ensure that a leak in the hydraulic seal can be detected as the hydraulic fluid will leak past openings in the seal. This will further prevent leaking hydraulic fluid from building up pressure behind the tip seal which may cause the tip seal to be dislodged. The use of complete circles as shown in FIG. 4D may be sufficient to protect against spark propagation from within the fitting 112 to the fuel tank.

Unlike traditional seals or hydraulic sealing rings (such as O-Rings), the tip seal 122 or sealing material 124 is not intended to prevent pressurized fluid from escaping the fitting 112, but rather simply provides a mechanical barrier between the location where sparks tend to be created and the fuel tank.

The internal tip seal further includes characteristics which supplement or replace existing anti-fretting coatings. These coatings reduce wear at the contact point between the fitting and metal tube caused by minute relative motion, such as that caused by vibration. The tip seal is also preferably of sufficient thickness to prevent dielectric breakdown and tough enough to resist damage during installation. It is of a material selected for compatibility with fuel and hydraulic fluids and the temperature extremes of aerospace applications. Materials such as FEP, PTFE, PEEK, and silicone elastomers, are examples of materials which may be suitable for internal tip seals.

Figure 5:
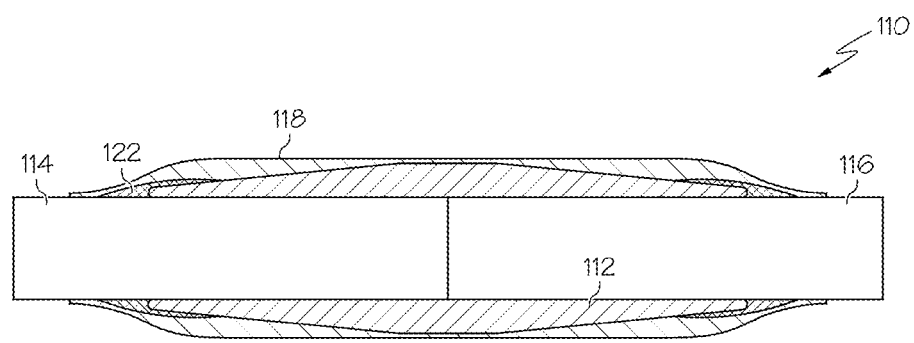
FIG. 5 is a cutaway view of an alternative embodiment.

Another aspect of the apparatus shown in FIG. 5 and includes multiple EME protective features to mitigate spark propagation. In this image, the hydraulic joint 110 includes fitting 112 about tubes 114 and 116. Tip seals 122 are applied between the fitting 112 and tubes 114, 116 and provide a barrier against spark propagation. A sleeve 118 is applied about the fitting 112 and a portion of the tubes 114, 116 as described above to provide a second additional barrier against spark propagation. These multiple EME protective provide include independent failure modes, thereby ensuring that a single failure cannot result in spark propagation from a spark zone to the fuel tank. It should be appreciated that the sealing material 124 shown in FIGS. 4B-D and described above may be used in addition to or in lieu of tip seals 122. Suitable shrink-wrap sleeve materials would include FEP, PTFE, PEEK, or other materials with suitable chemical and thermal properties and the ability to form a shrink-wrap tube.

The first method for preventing spark propagation is through the metal-to-metal interface between the fitting 112 and tubes 114, 116. The second is through the use of either external tip seals 122 or internal sealing material 124. The tip seals 122 or sealing material 124 provide a physical barrier between any sparking and the fuel tank. A third method for preventing spark propagation is through the use of a sleeve 118 or wrap that forms a mechanical barrier between the hydraulic joint 110 and the surrounding medium. Each of these methods of preventing spark propagation requires an individual failure condition, and therefore a combination of these methods satisfies the requirements of FAR 25.981.

Therefore, the proposed modified system will at least accomplish the goals as stated above by providing additional protection involving unique failure modes.

The examples presented here are single piece radially swaged or cryogenic fittings. It will be apparent to one trained in the art that the principles of sealing with tip seals and covering with wrap or tubular sleeving, in single or multiple pieces, may apply to multi-piece axially swaged fittings or other hydraulic fittings.

The various embodiments described above are intended to be illustrative in nature and are not intended to limit the scope of the invention. Any limitations to the invention will appear in the claims as allowed.

What is claimed is:

1. An aircraft, comprising:
   a fuselage, wings, and a hydraulic line passing through at least one of the wings;
   a hydraulic joint for preventing spark propagation along the hydraulic line;
   the hydraulic joint including a hydraulic fitting shaped to be positioned around a first hydraulic tube and a second hydraulic tube of the hydraulic line, the hydraulic fitting having an interior surface and a first open end for receiving the first hydraulic tube therein, wherein the interior surface of the hydraulic fitting defines an inner circumference; and
   sealing material applied around the inner circumference of the interior surface, the sealing material having a shape that defines an opening that allows for the passage of leaks of hydraulic fluid from the joint within the hydraulic fitting but forms a mechanical barrier to propagation of sparks along the first and the second hydraulic tubes, the sealing material positioned on the interior surface of the hydraulic fitting adjacent the first open end.

2. The aircraft of claim 1, wherein the hydraulic line controls a flap or other control structure of the aircraft.

3. The aircraft of claim 1, further comprising a sleeve surrounding the hydraulic fitting.

4. The aircraft of claim 3, wherein a thickness of the sleeve is between 0.005-0.20 inches and extends 0.25-1.5 inches beyond ends of the fitting.

5. The aircraft of claim 3, wherein the sleeve includes a wrapped tape and/or a heat shrink material.

6. The aircraft of claim 5, wherein the heat shrink material covers the wrapped tape, thereby preventing unwinding of the wrapped tape.

7. The aircraft of claim 3, wherein the sleeve is made of a dielectric material.

8. The aircraft of claim 1, further comprising a tip seal around a perimeter of an edge of the fitting.

9. The aircraft of claim 1, wherein the hydraulic fitting is a coupler for joining the first hydraulic tube to the second hydraulic tube.

* * * * *